US 6,178,852 B1

(12) United States Patent
Pfaff

(10) Patent No.: US 6,178,852 B1
(45) Date of Patent: Jan. 30, 2001

(54) ROTARY DIE LASER MACHINING AND HARDENING APPARATUS AND METHOD

(75) Inventor: Alan R. Pfaff, Orchard Lake, MI (US)

(73) Assignee: Atlantic Commerce Properties, Southfield, MI (US)

( * ) Notice: Under 35 U.S.C. 154(b), the term of this patent shall be extended for 0 days.

(21) Appl. No.: 09/199,833

(22) Filed: Nov. 25, 1998

(51) Int. Cl.[7] .......................................................... B21K 5/20
(52) U.S. Cl. .................. 76/107.1; 76/107.8; 219/121.85
(58) Field of Search ................................ 76/107.1, 107.8, 76/104.1; 219/201, 121.85, 121.67, 121.68, 121.72, 121.73

(56) References Cited

U.S. PATENT DOCUMENTS

| 4,473,735 | 9/1984 | Steffen | 219/121 |
| 4,608,895 | 9/1986 | Bell et al. | 83/345 |
| 5,061,839 | * 10/1991 | Matsuno et al. | 219/121.75 X |
| 5,575,185 | 11/1996 | Cox et al. | 76/107.1 |

FOREIGN PATENT DOCUMENTS

| 2013674 | 10/1971 | (DE) . | |
| 2752717 | 5/1979 | (DE) . | |
| 0191203 | 8/1986 | (EP) . | |
| 0228623 | * 9/1989 | (JP) | 76/107.1 |
| 9729878 | 8/1997 | (WO) . | |

* cited by examiner

Primary Examiner—Douglas D. Watts
(74) Attorney, Agent, or Firm—Reising, Ethington, Barnes, Kisselle, Learman & McCulloch, P.C.

(57) ABSTRACT

A pair of rotary die cylinders having co-acting cutting blades formed by integral lands projecting generally radially outwardly from the main body of each cylinder and a method of making them by rough machining a tool steel workpiece with conventional cutting tools to form the general contour and path of the cutting blades and thereafter final machining and simultaneously heat treating the cutting blades with a laser to provide an accurately formed and hardened cutting blade. Preferably, the rough machining with conventional cutting tools and the final machining and heat treating by a laser are performed with the same machine tool, such as a computerized numerical control (CNC) machining center. Such a machining center permits rapid and accurate rough machining as well as accurate final laser machining of the cutting blades. The more accurate final machining accomplished by a laser produces a more accurately formed cutting blade and also simultaneously heat treats the blade with minimal distortion of the blade and without any significant distortion of the core or body of the cylinder.

23 Claims, 2 Drawing Sheets

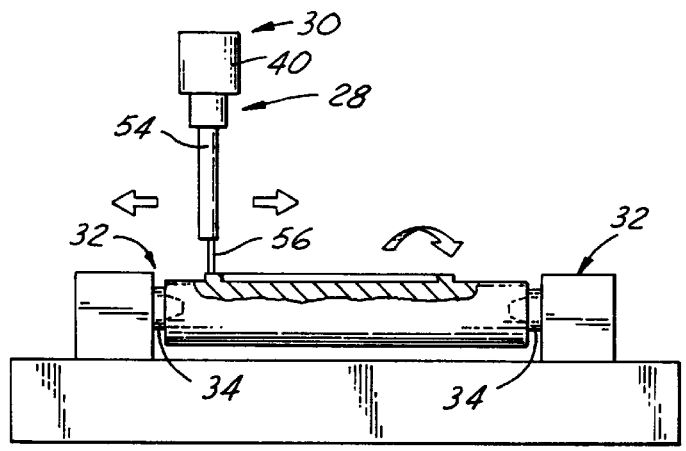
FIG. 3
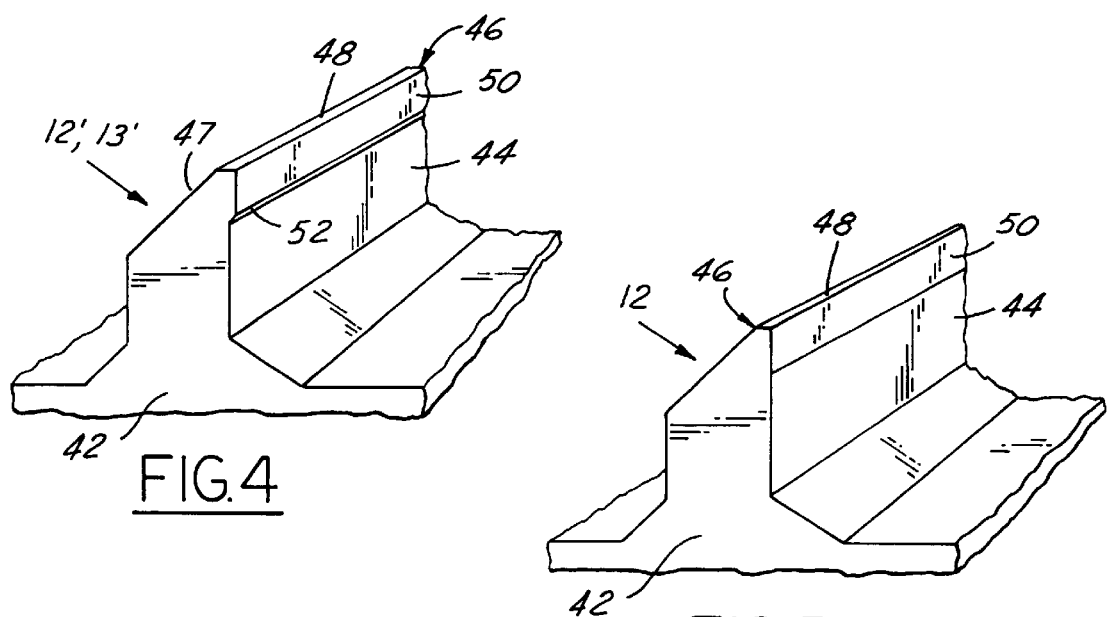
FIG. 4
FIG. 5
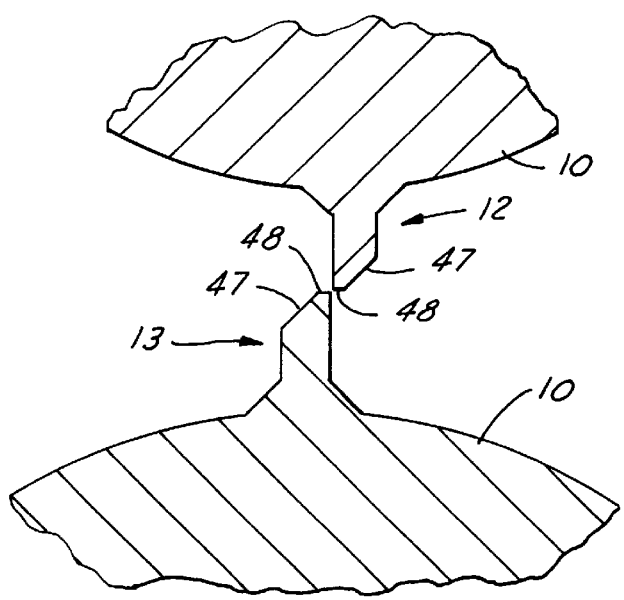
FIG. 6

ROTARY DIE LASER MACHINING AND HARDENING APPARATUS AND METHOD

FIELD OF THE INVENTION

This invention relates generally to rotary die cutting of blanks from thin sheets or webs of material and more particularly to improved rotary cutting dies and a method of making them.

BACKGROUND OF THE INVENTION

For many years a pair of superimposed rotary dies with cutting blades on one or both of the dies have been used to cut blanks from a thin web of material passing through the nip of the dies. Typically, the thin web is of a material such as paper, paperboard, cardboard, plastic film, metal foil, thin sheet metal, and the like.

U.S. Pat. No. 4,608,895 discloses a pair of rotary dies which are made from a cylindrical blank of tool steel which is hardened and then ground to produce a cylindrical surface before it is electrical discharge machined (EDM) to produce cutting blades on the surface of the dies with the desired geometry to cut the blanks. The cutting blades are formed on the rotary dies after the steel of the rotary dies is hardened to prevent the deformation which would occur if the cutting blades were formed and then the rotary dies were heat treated to harden the cutting blades. While these rotary dies have been sold commercially and performed satisfactorily for relatively high volume mass production operations, they are expensive and difficult both to manufacture and re-sharpen when they become worn or dull in use.

U.S. Pat. No. 5,575,185 discloses a pair of rotary dies having coacting cutting blades projecting generally radially outwardly from the main body of each rotary die. These rotary dies are formed of unhardened tool steel and the cutting blades may be formed by machining with conventional cutting tools. After the cutting blades are formed by machining, the cutting blades are hardened by heating to an elevated temperature with a laser and quenching them without substantially hardening the core or body of the workpiece and hence without distorting the core or body of the workpiece by heat treating it. Thus, this system obviates the need for EDM machining which reduces the cost to produce rotary dies.

However, conventional cutting tools tend to produce an undesirable offset or undercut when attempting to machine a cutting blade which extends generally radially outwardly from a rotary die cylinder. The undercut produces a cutting blade with a sharp edge or edges which wear quickly and may chip causing an unsatisfactory cut. Further, the blades with an undercut can cause a cut blank of material to become stuck on a cylinder interfering with the cutting of subsequent blanks and potentially jamming and damaging the cutting dies. Also, detailed portions of the cutting blades are difficult to form with conventional cutting tools and on average, 30% to 60% of the total machining time of cutting blades with conventional tools is spent forming such detailed portions as corners and cross-over portions.

SUMMARY OF THE INVENTION

A pair of rotary die cylinders having co-acting cutting blades formed by integral lands projecting generally radially outwardly from the main body of each cylinder and a method of making them by rough machining a tool steel workpiece with conventional cutting tools to form the general outline of the cutting blades and thereafter final machining and simultaneously heat treating the cutting blades with a laser to provide an accurately formed and hardened cutting blade. Preferably, the rough machining with conventional cutting tools and the final machining and heat treating by a laser are performed with the same machine tool, such as a computerized numerical control (CNC) machining center. Such a machining center permits rapid and accurate rough machining as well as accurate final laser machining of the cutting blades. The more accurate final machining accomplished by a laser produces a more accurately formed cutting blade and also simultaneously heat treats the blade with minimal distortion of the blade and without significant distortion of the core or body of the cylinder.

Objects, features and advantages of this invention are to provide a pair of rotary die cylinders with co-acting cutting blades which are easier and more accurately formed, can be initially rough formed with conventional cutting tools, are precisely formed into their final shape by a laser which simultaneously heat treats the cutting blade, can be heat treated and hardened without substantial distortion of the cutting blade or the die cylinder, provide a clean and accurate cut of a blank from a web of material, are of relatively simple design and economical manufacture and assembly and have a long in service useful life and may be formed by a method which is more accurate, faster, easier and less expensive than current methods of making the rotary die cylinders.

BRIEF DESCRIPTION OF THE DRAWINGS

These and other objects, features and advantages of this invention will be apparent from the following detail description of the preferred embodiment and best mode, appended claims and accompanying drawings in which:

FIG. 3 is a semi-schematic side view illustrating the final machining of a cutting blade on the rotary die cylinder by a laser according to the present invention to simultaneously accurately form the cutting blade and heat treat the blade to harden it;

FIG. 4 is a fragmentary view partially in section of a cutting blade before its final machining by a laser;

FIG. 5 is a fragmentary view partially in section of a cutting blade after its final machining by the laser; and FIG. 6 is a fragmentary sectional view illustrating a portion of the cutting blades on a pair of rotary die cylinders.

DETAILED DESCRIPTION OF THE PREFERRED EMBODIMENT

Figure 1:
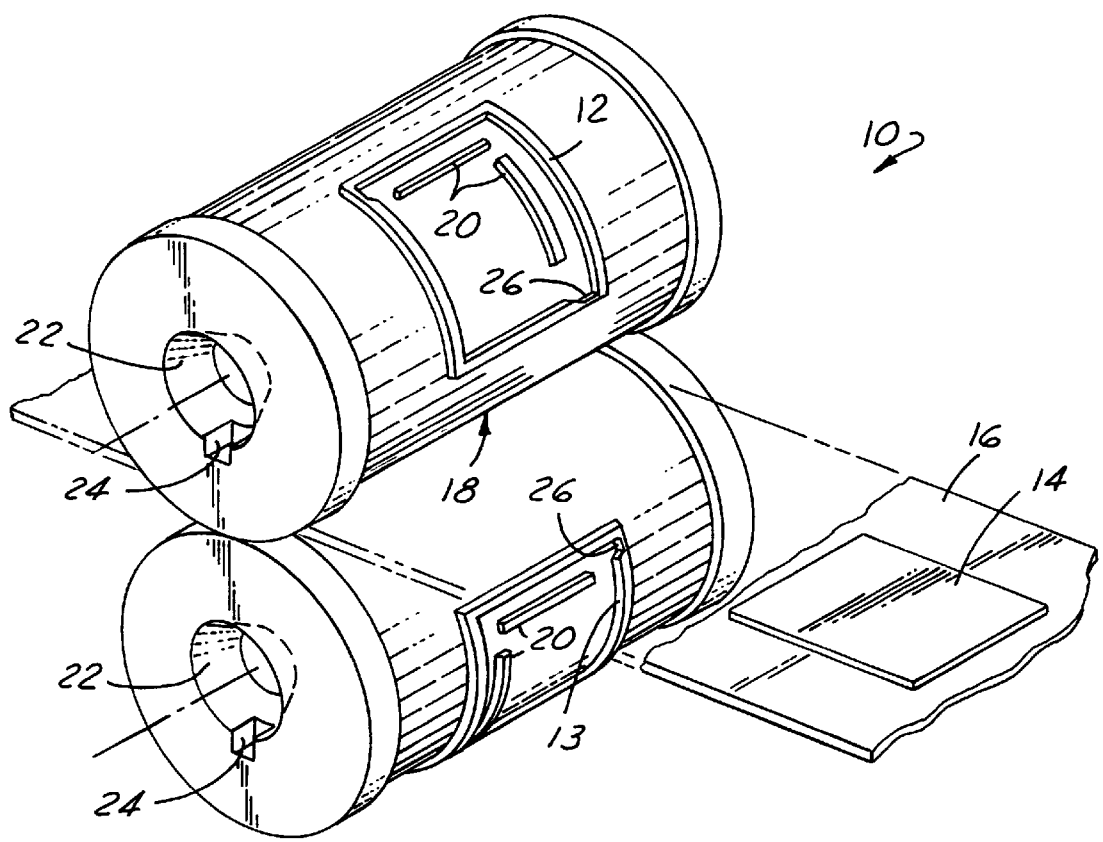
FIG. 1 is a perspective view of a pair of rotary die cylinders embodying this invention for cutting blanks from a web of material passing through their nip.

Referring in more detail to the drawings, FIG. 1 illustrates a pair of rotary die cylinders 10 embodying this invention and having co-acting cutting blades 12, 13 thereon which, when the cylinders 10 are co-rotating, cut generally rectangular blanks 14 from a web 16 of thin material, such as paperboard, passing through the nip 18 of the cylinders 10. Preferably, removal of blanks 14 from the die cylinders 10 is facilitated by pairs of ejector lands 20 within the perimeter of the cutting blades 12, 13.

In use, each die cylinder 10 is journalled for rotation by a pair of arbor assemblies having co-axial spindles with opposed noses (not shown) received in complementary recesses 22 in the opposed ends of each die cylinder 10. Each recess 22 is preferably a bore with a frustoconical side wall tapered inwardly from its associated cylinder end which provides a locator surface engageable with a complementary tapered surface on the nose of an associated spindle. For each die cylinder 10, the frustoconical surfaces of both its recesses 22 are on the same or common axis of rotation of the cylinder 10. In use, each cylinder 10 is driven through one or both spindles of its arbor assembly to co-rotate in opposed directions of rotation with essentially the same peripheral surface speed of its cutting blades 12, 13. One or both spindles are also coupled to their associated cylinder for rotation therewith by a key (not shown) received in a keyway 24 in the recess 22 of a cylinder 10. The construction and arrangement of the recesses 22, keyways 24 and frustoconical surfaces for journalling, locating and driving the die cylinders 10 is disclosed in greater detail in U.S. patent application Ser. No. 08/192,067 filed on Feb. 3, 1994, which issued as U.S. Pat. No. 5,842,399 on Dec. 1, 1998, the disclosure of which is incorporated herein by reference, and hence will not be described in further detail.

To produce a clean cut, the die cylinders 10 are constructed so that the position of the cutting edges of the co-acting blades 12, 13 can be varied and adjusted by moving the dies axially and/or in rotary phase relationship with respect to each other. This is accomplished by locating various portions of the cutting edge of the cutting blades 12, 13 of each die 10 so that relative movement of the dies 10 in one axial direction and/or one rotary phase direction causes all the axially and circumferentially extending cutting edge portions of the blades 12, 13 of both dies 10 to move toward and even overlap each other, and movement in the opposite axial and rotary phase direction causes all the cutting edges of the blades 12, 13 of both dies to move away and even be spaced from each other. The blades 12, 13 also have crossover portions 26 at which the cutting action between the blades 12, 13 shifts over from one edge to the other edge of each blade such as from the inner edge to the outer edge of blade 12 and the outer edge to the inner edge of blade 13. The construction and arrangement of suitable rotary dies 10 having cutting blades 12, 13 and crossovers 26 which permit such relative adjustment of the rotary dies are disclosed in U.S. Pat. No. 5,575,185, the disclosure of which is incorporated herein by reference in its entirety, and hence will not be described in further detail.

In accordance with this invention, the rotary die cylinders 10 can be made by machining with conventional cutting tools (FIG. 2), a cylinder of unhardened tool steel to substantially form the lands and crossovers of the cutting blades 12, 13 and thereafter form the final desired shape of the cutting blades 12, 13 and simultaneously heat treat them with a laser 28 (FIG. 3). If desired, the tool steel workpiece may be initially hardened to a moderate hardness which still permits machining by conventional tools. Preferably, both the initial machining with conventional cutting tools and the final machining with the laser 28 are performed on a computer numerical control (CNC) machining center to facilitate quickly and accurately forming the cutting blades 12, 13 on the die cylinders 10. The final machining by the laser 28 provides an extremely accurate, cutting blade 12, 13 and also simultaneously heat treats substantially only the cutting blade 12, 13 and not the die cylinder body, to avoid distortion of the cutting blades 12, 13 which would adversely affect their geometry and performance.

Figure 2:
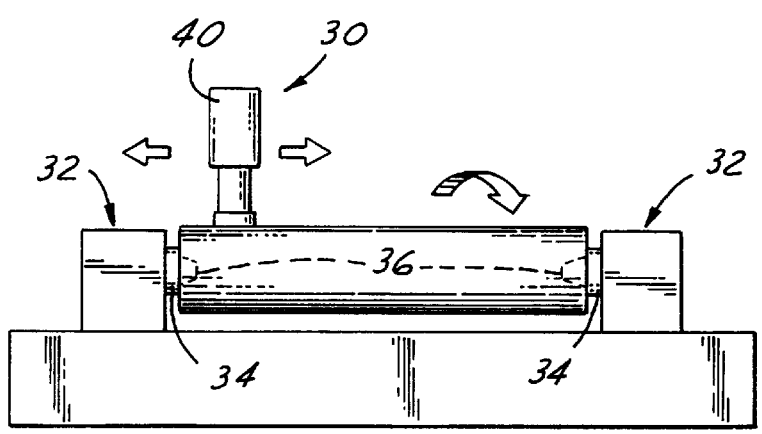
FIG. 2 is a semi-schematic side view illustrating the rough machining of a rotary die cylinder with a conventional cutting tool.

As shown in FIG. 2, to remove the bulk of the material from the peripheral outer face of the cylinders to initially or rough machine the outer faces of the cutting blades 12, 13 the cylinder 10 is accurately located and rotated in a machine tool 30 by arbors 32 with spindles 34 having complementary noses 36 engaging the recesses 22 in the ends of the cylinder 10. Preferably, peripheral portions of the cylinder 10 are machined away in rough cuts by a milling tool 38 rotated and moved along various axes by the tool spindle 40 in coordination with angular or arcuate rotary movement of the cylinder about its axis by the arbor spindles 34. Preferably, the coordinated movement of the spindle 40 and the cylinder 10 is performed by a CNC machine tool 30 having at least three orthogonal axes of movement of the spindles relative to the workpiece and one arcuate or rotary axis of movement of the workpiece relative to the spindle. Preferably, this machining is performed on a so-called five axis or six axis CNC machine tool. After the general contour of the cutting blades has been formed, inclined or beveled edges can be machined with an end milling tool received in the spindle of the CNC machine tool.

One presently preferred form of the cutting blades 12',13' after rough machining is shown in FIG. 4. Generally, the cutting blade 12', 13' has a base 42 adjacent the body of the cylinder 10 and narrowing into a middle portion 44 which narrows still further to a tip 46 of the cutting blade 12, 13. The tip 46 has a beveled back face 47, an elongate land portion 48 and a generally flat leading face 50 generally transverse to the land 48 and extending slightly outwardly of or overhanging the middle portion 44 of the cutting blade 12', 13'. This leading face 50 overhangs the adjacent middle portion 44 of the cutting blade 12 by only about 0.001 to 0.025 of an inch and preferably by about 0.003 to 0.020 of an inch, providing a slight step or shoulder 52 between them.

As shown in FIG. 3, after the rough machining of the cutting blade 12',13' the laser 28 replaces the conventional cutting tool in the spindle 40 of the CNC machine tool 30 to simultaneously final machine and heat treat the cutting blade 12', 13' to harden it. The emitter 54 of the laser 28 can be received in the spindle 40 of the CNC machine tool for orienting and manipulating it to direct its laser beam 56 onto the cutting blades 12', 13' while the cylinder 10 is received and located by its recesses 22 on the arbors 32 of the machine tool 30. The laser beam 56 is very small, typically on the order of about five to ten thousandths of an inch in diameter, is highly accurate and is typically surrounded by a stream of inert gas to provide a controlled environment for the laser machining. Due to the relatively small size of the laser beam 56, only a small amount of material is removed by the beam 56 at any given time. Thus, a substantial portion of the cutting blade 12 is formed by the rough machining process with conventional tools with only a small portion finish machined by the laser 28. Typically, 30% to 60% of the total machining time of a typical rotary die cylinder 10 is spent forming the corners, crossover portions, and other details of the cutting blades 12 which require high accuracy. These portions may be formed significantly faster with the laser beam 28 compared to methods using conventional cutting tools.

As shown in FIGS. 5 and 6, the finished cutting blades 12, 13 after laser machining has substantially the same configuration as the cutting blade 12',13' prior to laser machining with the exception that the overhang or shoulder 52 of the leading face 50 has been substantially if not completely removed by the laser 28 providing a finished leading face 50 which is generally continuous with or an extension of the middle portion 44 of the blade 12. It is desirable to machine the upper portion of the leading face 50 with the laser to remove undercutting of the leading face which occurs with conventional cutting tools and which would weaken the uppermost portion of the leading face, as well as to accurately finish machine or form and simultaneously heat treat the desired portion of the cutting blade 12. However, it is undesirable to remove too much metal with the laser 28 due to the slag or molten metal material which is displaced by the laser 28 and stream of inert gas and which may foul the cutting blade 12',13' surface.

Conversely, if insufficient material is left for removal by the laser 28, the cutting blades 12', 13' may not be elevated to a high enough temperature during the laser machining to effectively heat treat them. Thus, a moderate overhang in the range of about 0.003 to 0.020 of an inch is necessary to ensure sufficient heat treating of the cutting blades 12', 13' as they are laser machined while preventing an undesirable amount of slag, molten metal puddling or metal displacement shoulder 52 and recessed portion 44 both control the quantity of material available for removal by the laser and provide clearance for the molten metal to be rapidly removed from the laser machined surface. Preferably, the laser beam has a wavelength less than about 1064 nanometers to facilitate absorption of its energy by the polished steel rough machined blades and to avoid distortion of the laser finish machined and heat treated blades 12, 13. A YAG laser is believed to be preferable for this method.

For example, after rough machining, a cutting blade 12, 13 may have a land 48 with a width of about 0.035 of an inch, a flat leading face 50 with a radial extent of about 0.020 to 0.050 of an inch and preferably 0.035 of an inch and an outwardly overhanging a middle portion 44 by about 0.005 of an inch. The cutting blade 12, 13 may have an overall height or radial extent of about 0.070 to 0.10 of an inch and preferably about 0.080 of an inch. After final machining by the laser 28, the land 48 may have a width of about 0.030 of an inch with the overhang substantially if not completely removed. After being laser machined, a cutting blade 12, 13 has an increased hardness with a typical hardness of a finished blade being between about 58 to 64 on the Rockwell 'C' scale.

Thus, rotary die cylinders 10 having cutting blades 12 formed according to the present invention are more durable, reliable and accurate in use. The rough machining by conventional cutting tools is fast, easy and relatively inexpensive, and the final machining by the laser 28 is highly accurate and simultaneously heat treats the cutting blades 12, 13 to a desirable hardness without inexpensive, and the final machining by the laser 28 is highly accurate and simultaneously heat treats the cutting blades 12, 13 to a desirable hardness without significant distortion. Further, the laser machining reduces the undercut of the cutting blades 12 formed by conventional cutting tools in an attempt to provide generally radially outwardly extending faces 50 of the cutting blades 12, 13. The highly accurate laser 28 is much faster than conventional methods of forming the cutting blades, especially around corners, crossovers and other detailed portions of the cutting blades 12.

What is claimed is:

1. A method of making a rotary die cylinder comprising the steps of:

providing a cylindrical body of steel;

removing material from at least a portion of the outer periphery of the body to rough machine a cutting blade integral with the body, extending generally radially from the machined body and having a tip, a base and a leading face extending generally radially inwardly from the tip with at least a portion overhanging the base; and thereafter removing additional material from at least a portion of the leading face of the rough machined cutting blade with a laser to simultaneously both accurately form and heat treat the cutting blade to provide a finished, hardened cutting blade on the cylindrical body.

2. A method of making a rotary die cylinder comprising the steps of:

providing a cylindrical body of steel;

removing material from at least a portion of the outer periphery of the body to rough machine a cutting blade integral with the body, extending generally radially from the machined body, and having a tip, a base and a stepped leading face with an overhanging portion extending downwardly from the tip of the cutting blade and extending outwardly relative to an underlying adjacent portion of the leading face;

thereafter removing additional material from the rough machined cutting blade with a laser to simultaneously both accurately form and heat treat the cutting blade to provide a finished, hardened cutting blade on the cylindrical body; and the rough machining of the cutting blade substantially completely forms the cutting blade and the removing of additional material with the laser removes only a small amount of material from the cutting blade.

3. The method of claim 2 wherein the step of removing material to initially define a cutting blade is performed with conventional cutting tools.

4. The method of claim 2 wherein the body is formed of tool steel initially provided in a substantially unhardened state.

5. The method of claim 2 wherein the body is formed of tool steel which is prehardened to a degree still permitting removal of material from the body by conventional cutting tools.

6. The method of claim 2 wherein the laser is used to remove between about 0.003 to 0.020 of an inch of material along at least a portion of at least one surface of a cutting blade.

7. The method of claim 3 wherein the conventional cutting tools and the laser are received in a CNC machining center which controls their movement to cause the removal of the material from the body and the cutting blade.

8. The method of claim 2 wherein the step of removing additional material with a laser substantially completely removes the overhanging portion of the leading face of the rough machined cutting blade.

9. The method of claim 2 wherein the overhanging portion of the leading face of the rough machined cutting blade extends generally outwardly relative to the adjacent portion of the leading face by about 0.003 to 0.020 of an inch.

10. The method of claim 2 wherein the laser heat treats at least a portion of the tip and the leading face to harden at least these portions of the cutting blade.

11. A method of making a rotary die cylinder comprising the steps of:

providing a cylindrical body of steel;

removing material from at least a portion of the outer periphery of the body to rough machine a cutting blade extending generally radially from the machined body and having a tip, a base and a leading face with a stepped leading and overhanging portion extending downwardly from the tip of the cutting blade and extending outwardly relative to an underlying adjacent portion of the leading face; and thereafter removing additional material from the rough machined cutting blade with a laser to simultaneously both accurately form and heat treat the cutting blade to provide a finished, hardened cutting blade on the cylindrical body.

12. The method of claim 11 wherein the overhanging portion of the leading face of the rough machined cutting blade extends generally outwardly relative to the adjacent portion of the leading face by about 0.003 to 0.020 of an inch, extends generally radially about 0.020 to 0.050 of an inch and the cutting blade has a height of about 0.070 to 0.10 of an inch.

13. The method of claim 2 wherein the finished cutting blade has a hardness of about 58 to 64 on the Rockwell 'C' scale.

14. The method of claim 11 wherein the step of removing material to initially define a cutting blade is performed with conventional cutting tools.

15. The method of claim 11 wherein the body is formed of tool steel initially provided in a substantially unhardened state.

16. The method of claim 11 wherein the body is formed of tool steel which is prehardened to a degree still permitting removal of material from the body by conventional cutting tools.

17. The method of claim 11 wherein the step of removing material to rough machine a cutting blade substantially completely forms a cutting blade and the step of removing additional material with a laser removes only a small amount of material from the rough machined cutting blade.

18. The method of claim 17 wherein the laser is used to remove between about 0.003 to 0.020 of an inch of material along at least a portion of at least one surface of a cutting blade.

19. The method of claim 11 wherein the conventional cutting tools and the laser are received in a CNC machining center which controls their movement to cause the removal of the material from the body and the cutting blade.

20. The method of claim 11 wherein the step of removing additional material with a laser substantially completely removes the overhanging portion of the leading face of the rough machined cutting blade.

21. The method of claim 11 wherein the overhanging portion of the leading face of the rough machined cutting blade extends generally outwardly relative to the adjacent portion of the leading face by about 0.003 to 0.020 of an inch.

22. The method of claim 11 wherein the laser heat treats at least a portion of the tip and the leading face to harden at least these portions of the cutting blade.

23. The method of claim 11 wherein the finished cutting blade has a hardness of about 58 to 64 on the Rockwell 'C' scale.

* * * * *